(No Model.)

P. V. DWYER.
PIPE THIMBLE.

No. 601,709. Patented Apr. 5, 1898.

Witnesses:
F. H. Bradbury.
H. S. Johnson.

Inventor:
Patrick V. Dwyer.
per T. D. Merwin
Attorney.

UNITED STATES PATENT OFFICE.

PATRICK V. DWYER, OF ST. PAUL, MINNESOTA, ASSIGNOR TO LOUISE A. FRANK, OF SAME PLACE.

PIPE-THIMBLE.

SPECIFICATION forming part of Letters Patent No. 601,709, dated April 5, 1898.

Application filed May 15, 1896. Serial No. 591,736. (No model.)

*To all whom it may concern:*

Be it known that I, PATRICK V. DWYER, of St. Paul, Ramsey county, Minnesota, have invented certain Improvements in Pipe-Thimbles, of which the following is a specification.

My invention relates to improvements in floor and partition thimbles for pipes composed of two telescoping parts or sections; and it consists in providing a resilient screw-threaded connection between said parts which will compensate for any longitudinal movement and thus hold the flanges upon the opposite ends in close contact with the face of the floor or partition.

My invention further consists in the specific construction and combination hereinafter more particularly described and claimed.

Figure 1:
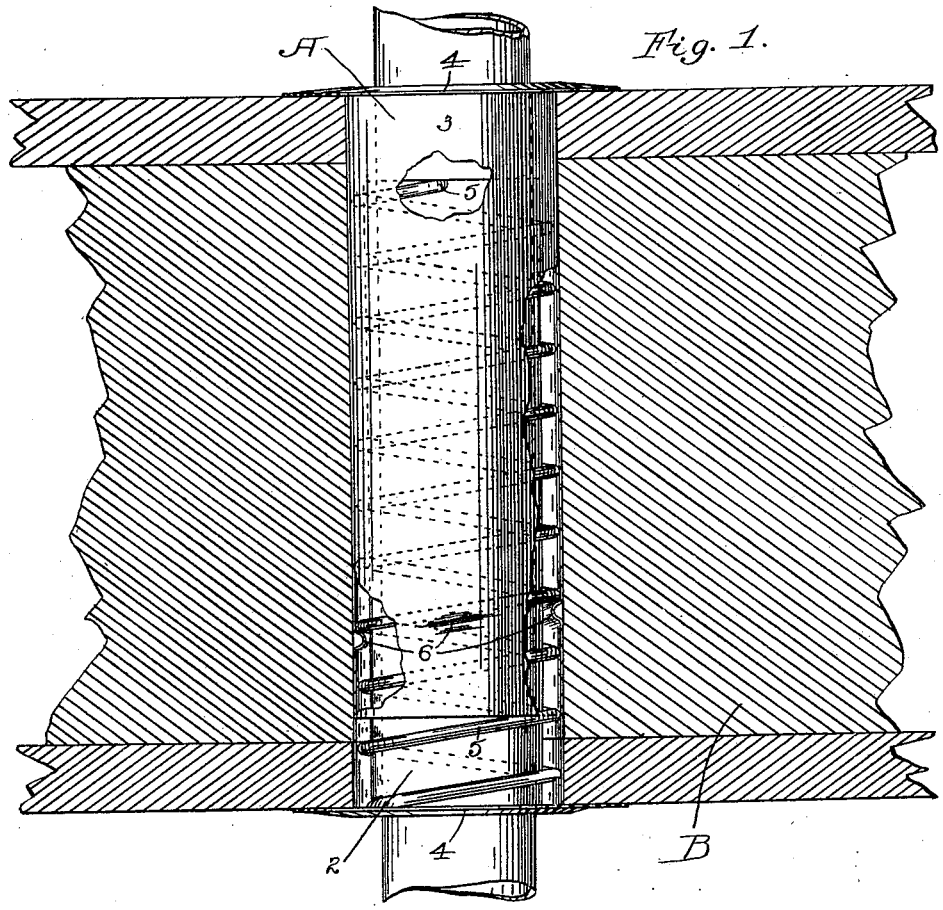
Figure 2:
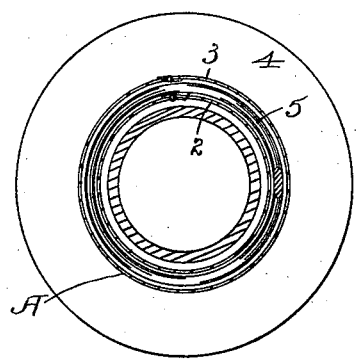

In the accompanying drawings, forming part of this specification, Figure 1 is a side elevation of my invention shown in place in the wall and partially broken away to show the interior construction, and Fig. 2 is a cross-section of my improved thimble.

In the drawings, A represents my improved thimble, made up of two telescoping parts or sections 2 and 3. Each of these sections is formed upon one end with the circumferential flange 4, which bears against the face of the wall B. The part 2 is smaller in diameter than the part 3, so as to fit inside of the same, and is provided upon its exterior with the outstanding screw-threads 5. These threads are formed by a contiguous wire coiled around the part 2 and, being connected at its ends only to the opposite ends of the same, thus constituting a spiral spring the intermediate coils of which elastically engage the other part. The interior wall of the corresponding part 3 is formed with indentations or threads 6, with which the wire threads 5 engage. The parts can thus be screwed together in the same manner as in the ordinary construction formed with the ordinary screw-thread, while at the same time the resiliency of the spring will compensate for any strain and hold the flanges in close contact with the opposite faces of the wall. In the construction generally used, formed with an ordinary screw-thread, the contraction and expansion of the pipe passing through the thimble and of the thimble itself and also the jar of the floor or wall causes the two parts to work loose. In my construction the resiliency of the spring connection will compensate for the strain and prevent such working loose.

I claim—

1. As an improved article of manufacture, a thimble of the class described, made up of telescoping sections, the intermediate spiral spring having its ends rigidly connected to one of said sections, and the threads or projections upon the other section engaging said spring intermediate of its ends.

2. As an improved article of manufacture, a thimble of the class described, comprising in combination the telescoping sections, the intermediate resilient spiral connected by its ends to one section, and the means carried by the other section for engaging said spiral intermediate of its connections.

In testimony whereof I affix my signature in presence of two witnesses.

PATRICK V. DWYER.

Witnesses:
H. S. JOHNSON,
MINNIE L. THAUWALD.